United States Patent [19]
Silletti et al.

[11] Patent Number: 5,449,205
[45] Date of Patent: Sep. 12, 1995

[54] HOSE-TO-TUBE CONNECTOR

[75] Inventors: Nicholas J. Silletti; Robert Schroeder, both of Rockford, Ill.

[73] Assignee: Quik Fit Corp., Rockford, Ill.

[21] Appl. No.: 292,713

[22] Filed: Aug. 18, 1994

[51] Int. Cl.⁶ .............................................. F16L 55/00
[52] U.S. Cl. .................................. 285/174; 285/175; 285/249; 285/369; 285/906
[58] Field of Search ............... 285/249, 246, 247, 258, 285/334.5, 175, 369, 906, 176, 174

[56] References Cited

U.S. PATENT DOCUMENTS

| | | | |
|---|---|---|---|
| 520,386 | 5/1894 | Barrett | 285/249 X |
| 791,905 | 6/1905 | Higginbotham | 285/249 |
| 2,464,416 | 3/1949 | Raybould | 285/249 |
| 3,218,094 | 11/1965 | Bauer | 285/249 |
| 3,730,564 | 5/1973 | Bachle et al. | 285/249 X |
| 3,918,679 | 11/1975 | Silvana | 285/249 X |
| 3,986,731 | 10/1976 | DeHoff | 285/249 X |
| 4,303,263 | 12/1981 | Legris | 285/249 |

FOREIGN PATENT DOCUMENTS

| | | | |
|---|---|---|---|
| 120128 | 2/1944 | Australia | 285/246 |
| 277120 | 3/1964 | Australia | 285/249 |

*Primary Examiner*—Dave W. Arola
*Attorney, Agent, or Firm*—Leydig, Voit & Mayer, Ltd.

[57] ABSTRACT

A rubber hose is coupled to a metal tube by a connector having an inner tubular component which is fixed within an internally threaded sleeve and which telescopes into the end portion of the hose. An externally threaded sleeve is rotatable on the end portion of the hose and, when tightened into the internally threaded sleeve, engages a nut on the end portion of the hose to force the tube axially onto a frustoconical portion of the tubular component and establish a seal around the hose. The thread of the nut is of opposite hand from the threads of the sleeves to prevent the nut from running off of the hose if the nut is turned during tightening of the externally threaded sleeve.

9 Claims, 3 Drawing Sheets

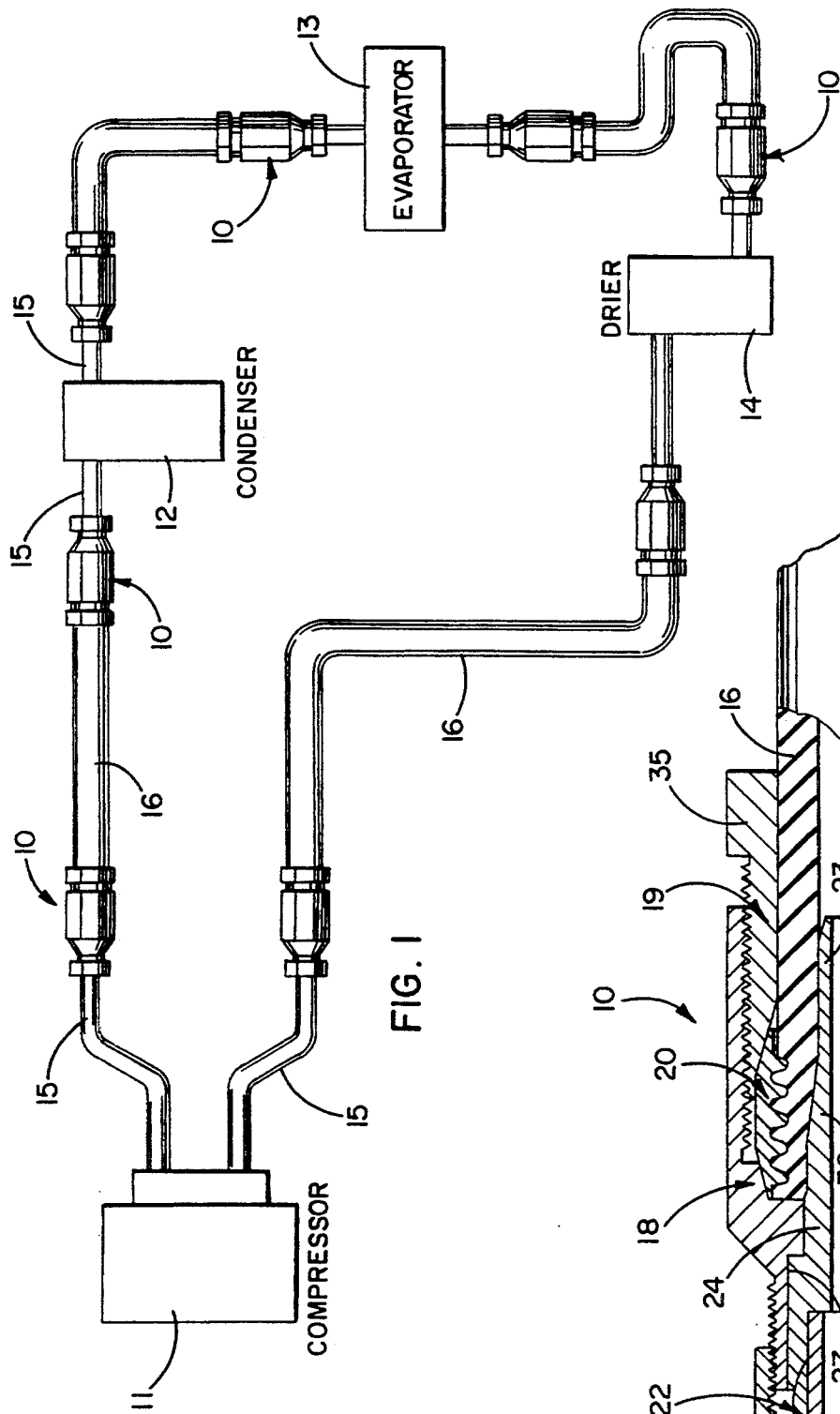

HOSE-TO-TUBE CONNECTOR

BACKGROUND OF THE INVENTION

This invention relates generally to a tube or hose connector and, more particularly, to a connector for coupling a hose made of rubber or other resiliently flexible material to either a metal tube or to another rubber hose.

The connector of the present invention has many applications. It has been specifically designed, however, for use in the harness of a vehicle air conditioning system. As originally manufactured, air conditioning harnesses have several metal tube-to-rubber hose connections which are formed by placing a metal sleeve over the hose, by telescoping the hose onto the tube, and by crimping the sleeve to secure the hose to the tube. As a result of vibration of the vehicle during use, the crimped connections experience a relatively short service life. As leaks occur, the air conditioning system must be periodically recharged with refrigerant in order to keep the system functional. Leaking refrigerant not only increases maintenance costs but also contaminates the atmosphere and depletes the ozone layer. When a leak becomes severe, the entire refrigerant harness must be replaced in most vehicles. Such replacement is expensive and leads to disposal of the old harness in landfills or the like.

United States Environmental Protection Agency regulations preclude the recharging of air conditioning systems with existing commonly used refrigerant (e.g., freon R12) after 1994. In order to accommodate an approved refrigerant (e.g., R134a), the entire air conditioning system, including the compressor, of older model cars, must be replaced if the system leaks to such an extent as to require recharging.

SUMMARY OF THE INVENTION

The general aim of the present invention is to provide a new and improved tube-to-hose connector which is virtually leakproof and which enables the repair of individual leaks in a vehicle air conditioning system without need of replacing the entire refrigerant harness of the system.

A related object of the invention is to provide connectors adapted to be uniquely coupled to the ends of a rubber hose and enabling virtually leakproof connection of the hose to metal tubes so as to enable a defective section of a refrigerant harness to be repaired while leaving the remaining sections of the harness intact.

In a detailed sense, the invention resides in a connector in which a nut is threaded onto the end portion of a rubber hose and coacts with threaded sleeves to force the hose axially onto a tubular component secured to a metal tube, with the hose being expanded outwardly by the tubular component in order to establish a virtually leakproof seal between the hose and the tube.

The invention also is characterized by the provision of a connector for establishing a virtually leakproof joint between two rubber hoses.

These and other objects and advantages of the invention will become more apparent from the following detailed description when taken in conjunction with the accompanying drawings.

BRIEF DESCRIPTION OF THE DRAWINGS

FIG. 1 is a schematic view of a vehicle air conditioning system equipped with new and improved connectors incorporating the unique features of the present invention.

FIG. 2 is a cross-section taken axially through a rubber hose and a metal tube joined by one of the connectors shown in FIG. 1.

Figure 3:
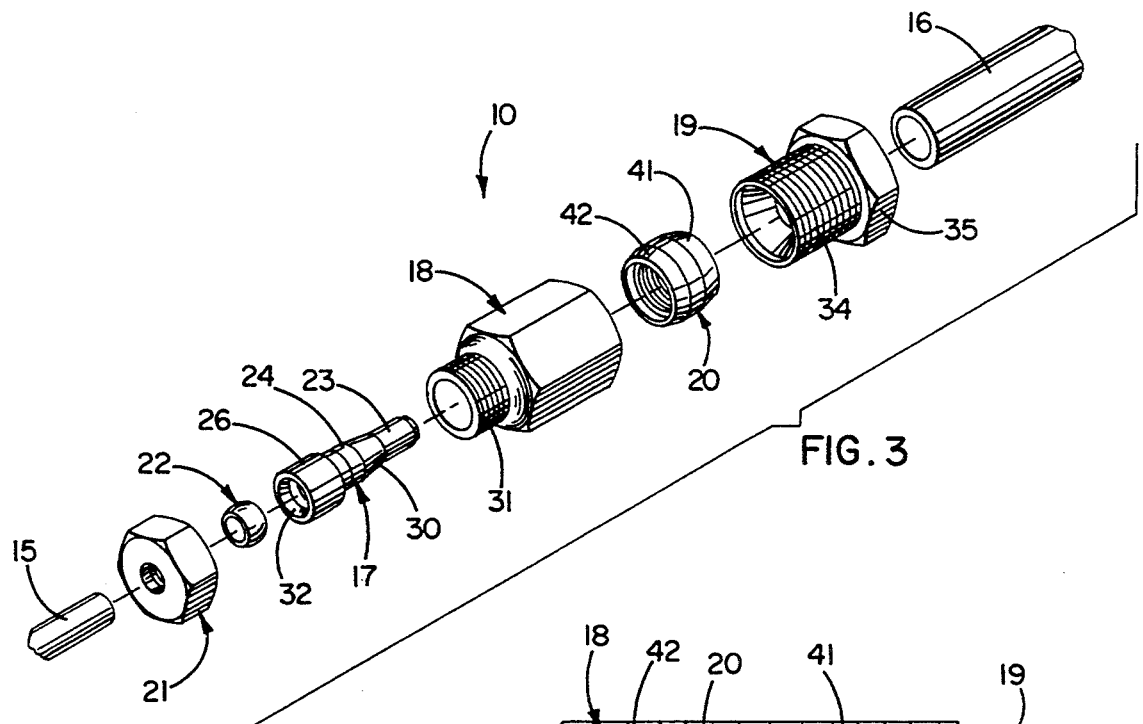
FIG. 3 is an exploded perspective view of the components shown in FIG. 2.

While the invention is susceptible of various modifications and alternative constructions, certain illustrated embodiments hereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENTS

A vehicle air conditioning system has been shown in FIG. 1 in order to illustrate one advantageous application of connectors 10 incorporating the features of the present invention. The air conditioning system typically includes a compressor 11, a condenser 12, an evaporator 13 and a drier 14. Each of those components includes two metal tubes 15 for supplying refrigerant to and delivering refrigerant from the component. The metal tubes 15 of each component are connected to the tubes of the adjacent upstream and downstream components by resiliently flexible tubes 16 which herein are in the form of rubber hoses, although hoses made of other flexible material could be used in lieu of rubber hoses.

The air conditioning system has been shown in FIG. 1 as utilizing a connector 10 of the invention to couple each one of the metal tubes 15 to the adjacent rubber hose 16. It will be appreciated, however, that the invention finds particularly advantageous use in retrofitting a system having an existing refrigerant harness of the type in which one or more crimped joints between a metal tube and a rubber hose becomes defective or where the hose itself develops a leak. In such an instance, the hose is replaced with a new hose which is joined to the upstream and downstream metal tubes by two connectors 10 at the ends of the new hose.

FIG. 2 shows a connector 10 coupling a metal tube 15 to a rubber hose 16. The components of the connector first will be described generally and then each will be described in more detail. In general, the connector includes an inner tubular component 17, first and second sleeves 18 and 19, a ring 20 which, in carrying out the invention, is in the form of a threaded nut, another sleeve or nut 21 and a compression ring 22.

Specifically, the inner tubular component 17 includes a first end portion 23 which is sized to telescope slidably into the end portion of the hose 16, the extreme end of the end portion 23 being tapered to facilitate insertion of the end portion into the hose. The second or opposite end portion 24 of the tubular component 17 is significantly larger in diameter than the first end portion 23, is located outside of the hose 16 and is spaced axially from the end thereof. The second end portion 24 of the tubular component 17 is received within a bore 25 in the sleeve 18 and is formed with an enlargement 26 which is received in a counterbore 27 in the sleeve 18 and which, in turn, is formed with a counterbore 28. In carrying out the invention, the tubular component 17 is formed with a frustoconical intermediate portion 30 located between the end portions 23 and 24 and shaped so as to increase in diameter upon progressing axially from the end portion 23 toward the end portion 24.

The tubular component 17 is coupled tightly to the sleeve 18 and this may be achieved in a variety of ways. In the present instance, the end portion 24 and the enlargement 26 are received in the bore 25 and the counterbore 27, respectively, with a tight press fit, the axially facing shoulder of the enlargement 26 being disposed in engagement with the bottom of the counterbore 27. The tubular component 17 may, however, be brazed to the sleeve 18 or, as a further alternative, the tubular component and the sleeve may be cast and/or machined as a single unit.

The nut 21 and the compression ring 22 are used to secure the metal tube 15 to the sleeve 18 with the tube in axial alignment with the tubular component 17. As shown in FIG. 2, the sleeve 18 is formed with a nose 31 which is externally threaded to accommodate the nut 21. The nut 21 and the compression ring 22 are slipped onto the end portion of the tube 15 and thereafter the tube is inserted into the counterbore 28 of the enlargement 26 until the end of the tube engages the bottom of the counterbore. When the nut 21 is tightened onto the threaded nose 31, the ring 22 is compressed between the nut and the enlargement and is squeezed inwardly into tight gripping engagement with the tube 15. The ring 22 is made of brass or other relatively soft material and, upon being compressed, deforms into tight sealing contact with the tube. The nut 21 and the enlargement 26 are ramped as indicated at 32 in FIG. 2 and mate intimately with the outer surfaces of the end portions of the ring 22 to establish a virtually leakproof seal against such surfaces.

Figure 4:
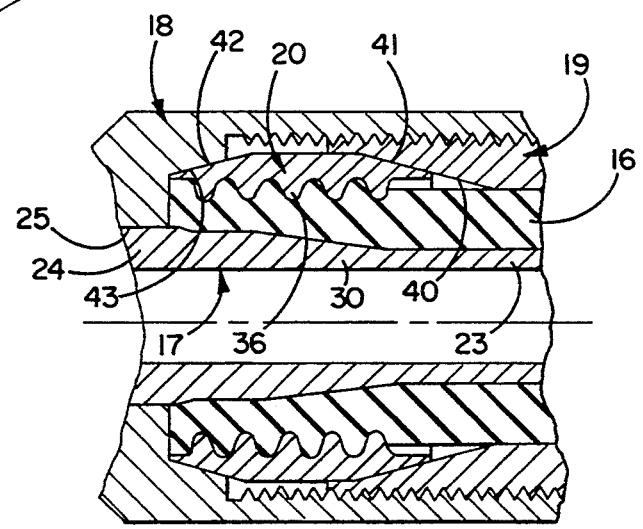
FIG. 4 is an enlarged view of portions of the connector shown in FIG. 2.

An internal thread 33 (FIG. 6) is formed within the sleeve 18 and is adapted to mate with an external thread 34 formed on the sleeve 19, the latter also being formed with a wrenching head 35 (FIG. 3). The sleeve 19 is sized to slip onto the end portion of the hose 16 with a rotatable fit and is installed on the hose before the latter is telescoped onto the end portion 23 of the tubular member 17. After the sleeve 19 has been slipped onto the hose, the nut 20 is threaded onto the end portion of the hose. The nut 20 is made of brass or other soft material and is formed with a rounded thread 36 (FIG. 4) and may be threaded onto the hose while the hose is held tightly against turning. Importantly, and for a purpose to be described subsequently, the thread 36 of the nut 20 is opposite in hand from the threads 33 and 34 of the sleeves 18 and 19, respectively. In this instance, the thread 36 of the nut 20 is a left-handed thread.

In order to couple the tube 15 and the hose 16, the unit consisting of the tubular component 17 and the sleeve 18 is connected to the tube by the nut 21 and the compression ring 22 in the manner described previously. With the sleeve 19 and the nut 20 installed on the hose, the hose is moved axially into the sleeve 18 and is telescoped onto the smaller diameter end portion 23 of the tubular component 17 until the end of the hose engages the frustoconical intermediate portion 30. The outer diameter of the nut 20 is smaller than the inner diameter of the threaded portion 33 of the sleeve 18 and thus the nut slips into the sleeve as the tube is telescoped onto the end portion 23 of the tubular component 17.

Figure 6:
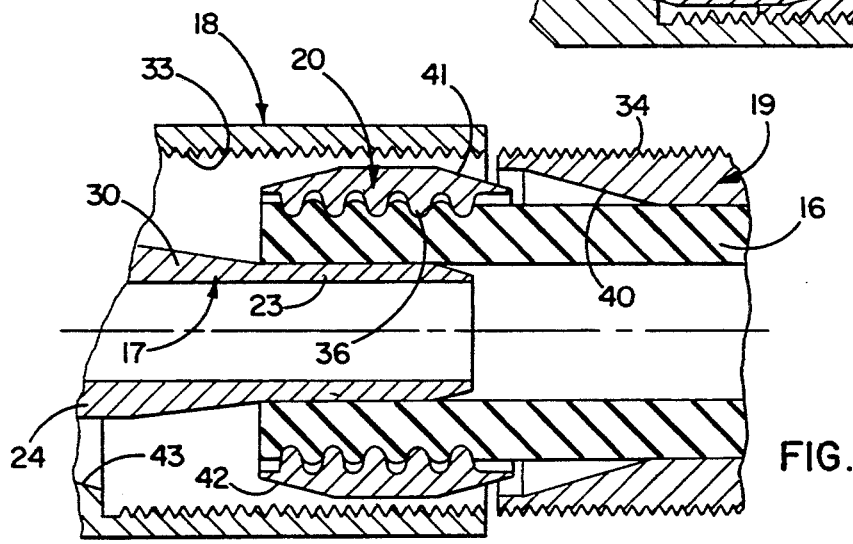
FIG. 6 is an enlarged view of portions of the connector shown in FIG. 5.
Figure 5:
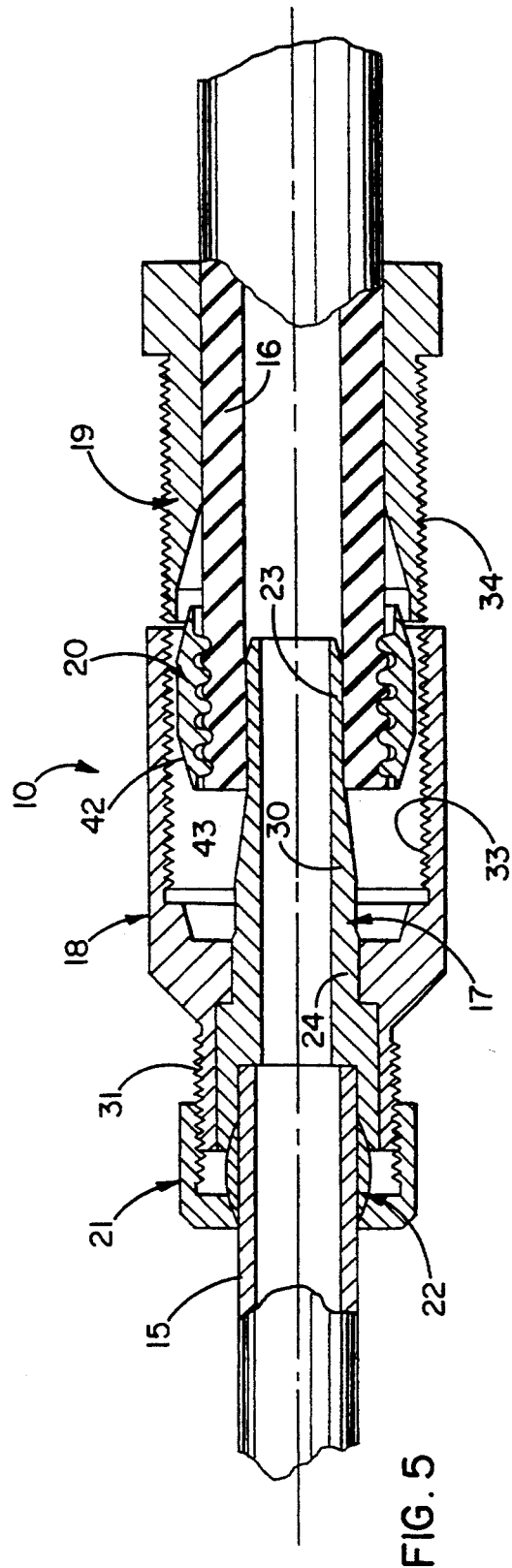
FIG. 5 is a view generally similar to FIG. 2 but shows certain components of the connector as positioned just prior to final assembly of the components.

With the various components thus positioned, the sleeve 19 may be slid along the hose 16 until its end abuts the end of the sleeve 18 and the end of the nut 20 as shown in FIGS. 5 and 6. When the sleeve 19 is rotated by means of a tool (not shown) applied to the head 35, it threads into the sleeve 18 and, with further turning, acts against the nut 20 to force the hose 16 axially onto the frustoconical portion 30 of the tubular component 17. As a result, the end portion of the hose is expanded outwardly by the frustoconical portion 30 to establish a seal between the hose and the tubular component. In order to enhance such seal, the end portion of the bore in the sleeve 19 and the adjacent end portion of the nut 20 are formed with mating frustoconical surfaces 40 and 41 (FIGS. 4 and 6), respectively, which, upon tightening of the sleeve 19, not only seal against one another but also cause the soft nut to be squeezed inwardly into engagement with the hose and cause the hose to be squeezed inwardly against the frustoconical portion 30 of the tubular component 17. As the sleeve 19 is further tightened, a frustoconical surface 42 on the leading end portion of the nut 20 moves into wedging engagement with a complementary frustoconical surface 43 in the sleeve 18 to establish a seal between those surfaces, to cause the leading end portion of the nut to be squeezed inwardly against the hose and to cause the extreme end portion of the hose to be squeezed inwardly against the end portion 24 of the tubular component 17 (see FIGS. 2 and 4). Accordingly, the frustoconical surfaces 30 and 40–43 result in a virtually leakproof seal.

Because the sleeve 19 and the nut 20 have threads 34 and 36 of opposite hand, any turning of the nut by the sleeve during tightening of the sleeve does not tend to run the nut off of the end of the hose 16 but instead tends to draw the nut further onto the hose and forces the frustoconical surfaces 40 and 41 into even tighter engagement. By virtue of such engagement and by virtue of the thread 36 of the nut 20 being squeezed into engagement with the hose, the hose is tightly captivated against being pulled axially out of the sleeve 19.

From the foregoing, it will be apparent that the present invention brings to the art a new and improved hose-to-tube connector 10 in which the tubular component 17, the sleeves 18 and 19 and the nut 20 coact with the nut 21 and the compression ring 22 to effect a tight and reliable seal between the metal tube 15 and the rubber hose 16. If a leak should happen to develop at the connector during service use, the leak in some cases may be eliminated by simply tightening the sleeve 19 to a greater degree in order to cause the frustoconical surfaces 42 and 43 to squeeze the hose more tightly around the tubular component 17. The connector may be used in industrial hydraulic systems as well as in vehicle air conditioning systems and, when used in the latter, overcomes the disadvantages of prior systems as enumerated above under the heading "Background of the Invention".

Figure 7:
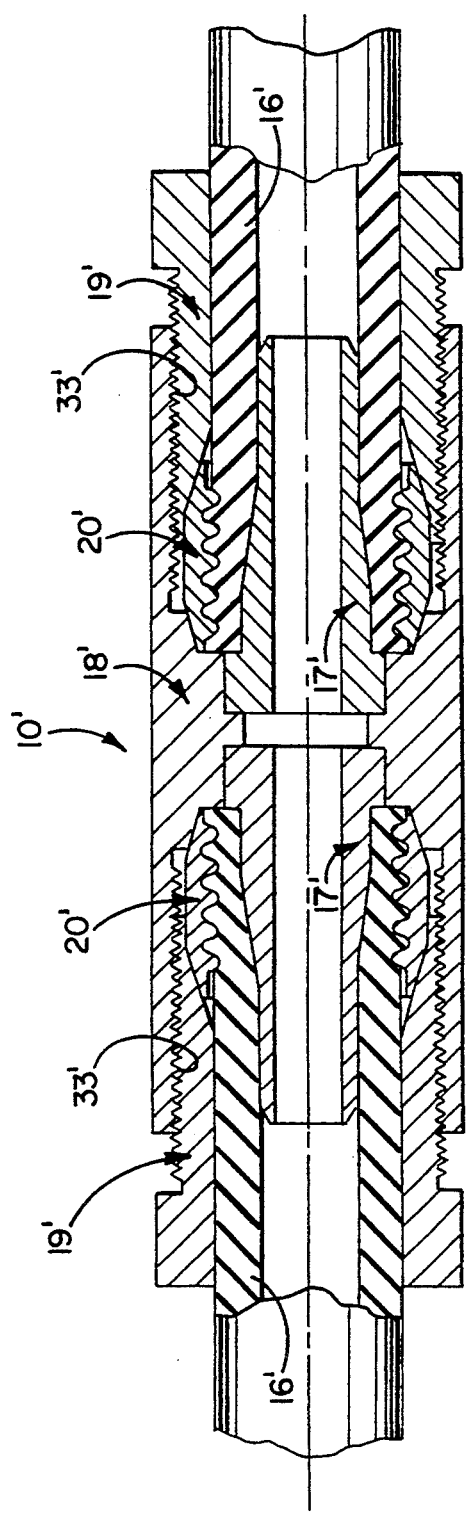
FIG. 7 is another view similar to FIG. 2 but shows a modified connector for coupling two rubber hoses to one another.

FIG. 7 shows a modified connector 10' which may be used to couple two rubber hoses 16' to one another. Associated with each hose is a tubular component 17', a sleeve 19' and a nut 20'. The sleeves 19' are adapted to be tightened into a single sleeve 18' having two internally threaded end portions 35' for receiving the sleeves 19'. The tubular components 17' are disposed in end-to-end relation with one another and are received with a press fit in the sleeve 18'.

We claim:

1. The combination of, a hose made of resiliently yieldable material and having an end portion, and a connector coupled to the end portion of said hose, said connector comprising an inner tubular component having a first end portion telescoped into said hose, having a second end portion located outside of said hose and spaced axially from the end thereof, and having a generally frustoconical intermediate portion located between said first and second end portions, said frustoconical portion increasing in diameter upon progressing from said first end portion toward said second end portion, a first sleeve coupled tightly to said second end portion of said tubular component and having a threaded portion spaced radially outwardly from said tubular component, a nut encircling the end portion of said hose and threaded onto said hose, said nut having an outer surface whose diameter is smaller than the inner diameter of said sleeve, said nut telescoping slidably into said sleeve when said hose is telescoped onto said first end portion of said tubular component, a second sleeve having a threaded portion threadably connected to the threaded portion of said first sleeve and rotatable relative to said hose and said nut, said second sleeve being operable when rotated in a predetermined direction to engage said nut and force said hose to move axially into telescoping relation with the frustoconical portion of said tubular component thereby to expand said hose radially outwardly into tight sealing engagement with said frustoconical portion the thread of said nut and the threads of the threaded portions of said sleeves being of opposite hand whereby said nut threads along said hose and away from the end thereof if said nut is rotated by said second sleeve during turning of said second sleeve in said predetermined direction.

2. The combination defined in claim 1 in which said first sleeve and a first end portion of said nut include mating frustoconical surfaces which coact to squeeze said first end portion of said nut radially inwardly when said second sleeve is turned in said predetermined direction after said hose has been forced axially through said predetermined distance.

3. The combination defined in claim 2 in which said second sleeve and a second end portion of said nut include mating frustoconical surfaces which coact to squeeze said second end portion of said nut radially inwardly when said second sleeve is turned in said predetermined direction after said,hose has been forced to move axially through said predetermined distance.

4. The combination defined in claim 1 in which said first sleeve and one end portion of said nut include mating frustoconical surfaces, said second sleeve and the opposite end portion of said nut also including mating frustoconical surfaces, the frustoconical surfaces on said sleeves coacting with the mating frustoconical surfaces on said nut to squeeze the end portions of said nut radially inwardly when said second sleeve is turned in said predetermined direction after said hose has been forced axially into tight telescoping relation with said frustoconical portion of said tubular component.

5. The combination defined in claim 1 further including a tube having an end portion telescoped into said first sleeve, means encircling said end portion of said tube, a third sleeve threadably connected to said first sleeve and operable when rotated in a preselected direction to engage said means and force said tube axially toward said tubular component.

6. The combination defined in claim 5 in which said tube is made of metal.

7. The combination defined in claim 5 in which said second tube is a second hose made of resiliently flexible material, said means comprising a second nut threaded onto an end portion of said second hose and having a thread of opposite hand from said third sleeve, and a second tubular component joined rigidly to said first sleeve and having a first end portion telescoped into the end portion of said second hose, a second end portion spaced axially from the end of said second hose and a generally frustoconical portion located between the first and second end portion of said second tubular component.

8. The combination defined in claim 1 in which the threaded portion of said first sleeve is an internally threaded portion, the threaded portion of said second sleeve being an externally threaded portion which is screwed into said internally threaded portion of said first sleeve.

9. A connector comprising an inner tubular component having first and second axially spaced end portions and having a generally frustoconical intermediate portion located between said first and second end portions, said frustoconical portion increasing in diameter upon progressing from said first end portion toward said second end portion, a first sleeve joined non-rotatably to said tubular component and having a threaded portion spaced radially outwardly from said tubular component, a nut having an outer surface whose diameter is smaller than the inner diameter of said sleeve, said nut being telescoped slidably into said sleeve, a second sleeve having a threaded portion threadably connected to the threaded portion of said first sleeve and rotatable relative to said nut, said second sleeve being operable when rotated in a predetermined direction to engage said nut and force said nut axially into said first sleeve and toward the second end portion of said tubular component, the thread of said nut and the threads of said sleeves being of opposite hand.

* * * * *